United States Patent
Yang

(10) Patent No.: US 12,498,594 B2
(45) Date of Patent: Dec. 16, 2025

(54) POLARIZER AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Wenhua Yang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 878 days.

(21) Appl. No.: 17/420,103

(22) PCT Filed: May 17, 2021

(86) PCT No.: PCT/CN2021/094097
§ 371 (c)(1),
(2) Date: Jun. 30, 2021

(87) PCT Pub. No.: WO2022/217690
PCT Pub. Date: Oct. 20, 2022

(65) Prior Publication Data
US 2023/0139981 A1 May 4, 2023

(30) Foreign Application Priority Data
Apr. 14, 2021 (CN) .......................... 202110410776.0

(51) Int. Cl.
*G02F 1/01* (2006.01)
*G02B 5/22* (2006.01)
*G02B 5/30* (2006.01)

(52) U.S. Cl.
CPC ............. *G02F 1/0136* (2013.01); *G02B 5/22* (2013.01); *G02B 5/3033* (2013.01); *G02F 2203/055* (2013.01)

(58) Field of Classification Search
CPC ... G02F 1/0136; G02F 2203/055; G02B 5/22; G02B 5/3033
See application file for complete search history.

(56) References Cited

U.S. PATENT DOCUMENTS

2006/0234035 A1* 10/2006 Wang .................. C08J 7/043
428/327
2009/0251644 A1* 10/2009 Park .................... G02F 1/13452
349/96
(Continued)

FOREIGN PATENT DOCUMENTS

CN          104950370 A    9/2015
CN          105974508 A    9/2016
(Continued)

OTHER PUBLICATIONS

Wikipedia webpage Waveplate (Year: 2021).*

*Primary Examiner* — George G. King
(74) *Attorney, Agent, or Firm* — The Roy Gross Law Firm, LLC; Roy D. Gross

(57) ABSTRACT

The present application provides a polarizer and a display device. The polarizer is fixed to one side of a display panel. The polarizer includes a polarizing layer and at least one functional layer stacked on the polarizing layer. The functional layer is added with a light absorber to reduce transmittance of light with a predetermined wavelength. This can effectively solve a problem that a color temperature of the display panel drops greatly after irradiation of the light of the
(Continued)

predetermined wavelength. The present application also improves viewing angles and relieves color shift and dark-state light leakage.

9 Claims, 2 Drawing Sheets

(56) References Cited

U.S. PATENT DOCUMENTS

| | | | |
|---|---|---|---|
| 2013/0044282 A1* | 2/2013 | Kuwabara | B32B 17/08 |
| | | | 313/504 |
| 2017/0139234 A1* | 5/2017 | Sharp | G02B 27/288 |
| 2017/0317315 A1* | 11/2017 | Yang | H10K 59/8792 |
| 2018/0203174 A1* | 7/2018 | Lee | G02B 5/3041 |
| 2019/0011752 A1* | 1/2019 | Inoue | G02B 5/3025 |
| 2019/0250317 A1* | 8/2019 | Choi | G02B 5/3016 |
| 2019/0250431 A1* | 8/2019 | Shan | G02B 5/3075 |

FOREIGN PATENT DOCUMENTS

| | | |
|---|---|---|
| CN | 105988154 A | 10/2016 |
| CN | 106772753 A | 5/2017 |
| CN | 107340557 A | 11/2017 |
| CN | 207817242 U | 9/2018 |
| WO | 2017168807 A1 | 10/2017 |

\* cited by examiner

POLARIZER AND DISPLAY DEVICE

CROSS REFERENCE TO RELATED APPLICATIONS

This application is a National Phase of PCT Patent Application No. PCT/CN2021/094097 having International filing date of May 17, 2021, which claims the benefit of priority of Chinese Application No. 202110410776.0 filed on Apr. 14, 2021. The contents of the above applications are all incorporated by reference as if fully set forth herein in their entirety.

FIELD OF DISCLOSURE

The present application relates to the field of display technology, and in particular, to a polarizer and a display device.

DESCRIPTION OF RELATED ART

Polarizers in conventional display devices are mainly used to convert incident natural light into polarized light. However, with rapid development of optical technology, the polarizers are not limited to having a single function. At present, there is a demand on the market to use OLED displays in sunlight. Color temperatures of the OLED displays decrease after being exposed to sunlight. If the color temperatures decrease too much, the color temperatures of the OLED displays after exposure to ultraviolet light are yellowish.

Therefore, there is an urgent need to overcome the present shortcomings.

SUMMARY

It is an objective of the present application to provide a polarizer and a display device. The polarizer is used in the display device to effectively solve a problem that a color temperature of a display panel drops greatly after irradiation of light of a predetermined wavelength.

The present application provides a polarizer, comprising: a polarizing layer and at least one functional layer stacked on the polarizing layer, wherein a light absorber is added in the at least one functional layer to reduce transmittance of light of a predetermined wavelength.

Optionally, in some embodiments of the present application, the transmittance of the polarizer to the light of the predetermined wavelength is less than 15%.

Optionally, in some embodiments of the present application, the predetermined wavelength ranges from 200 nm to 480 nm.

Optionally, in some embodiments of the present application, the functional layer comprises: at least one adhesive layer disposed on one side of the polarizer and connected to a display panel; and at least one protective layer disposed on another side of the polarizer.

Optionally, in some embodiments of the present application, the functional layer further comprises a compensation layer; the functional layer comprises two adhesive layers, and the two adhesive layers are a first adhesive layer and a second adhesive layer; the protective layer is arranged on one side of the polarizing layer; the first adhesive layer is disposed on one side of the polarizing layer away from the protective layer; the compensation layer is arranged on one side of the first adhesive layer away from the polarizing layer; the second adhesive layer is disposed on one side of the compensation layer away from the first adhesive layer; and the polarizer is fixed to the display panel through the second adhesive layer.

Optionally, in some embodiments of the present application, the protective layer comprises a hardened layer, and the hardened layer is arranged on one side of the protective layer away from the polarizing layer.

Optionally, in some embodiments of the present application, the light absorber is added in the hardened layer.

Optionally, in some embodiments of the present application, the polarizer further comprises a release film layer, and the release film layer is disposed on one side of the adhesive layer away from the polarizing layer and is detachable to expose the at least one adhesive layer.

The present application further provides a display device comprising a display panel and a polarizer, wherein the polarizer is fixed on one side of the display panel, the polarizer comprises a polarizing layer and at least one functional layer stacked on the polarizing layer, and a light absorber is added in the functional layer to reduce transmittance of light of a predetermined wavelength.

Optionally, in some embodiments of the present application, the transmittance of the polarizer to the light of the predetermined wavelength is less than 15%.

Optionally, in some embodiments of the present application, the predetermined wavelength ranges from 200 nm to 480 nm.

Optionally, in some embodiments of the present application, the functional layer comprises: at least one adhesive layer disposed between the polarizer and the display panel; and at least one protective layer disposed on one side of the polarizer away from the display panel.

Optionally, in some embodiments of the present application, the functional layer further comprises a compensation layer; the functional layer comprises two adhesive layers, and the two adhesive layers are a first adhesive layer and a second adhesive layer; the protective layer is arranged on one side of the polarizing layer; the first adhesive layer is disposed on one side of the polarizing layer away from the protective layer; the compensation layer is arranged on one side of the first adhesive layer away from the polarizing layer; the second adhesive layer is disposed on one side of the compensation layer away from the first adhesive layer; and the polarizer is fixed to the display panel through the second adhesive layer.

Optionally, in some embodiments of the present application, the protective layer comprises a hardened layer, and the hardened layer is arranged on one side of the protective layer away from the polarizing layer.

Optionally, in some embodiments of the present application, the light absorber is added in the hardened layer.

Optionally, in some embodiments of the present application, a material of the polarizing layer comprises polyvinyl alcohol.

Optionally, in some embodiments of the present application, a material of the protective layer comprises at least one of triacetyl cellulose, polymethyl methacrylate, polyethylene terephthalate, or cyclic olefin polymer.

Optionally, in some embodiments of the present application, a material of the at least one adhesive layer comprises a pressure sensitive adhesive.

Optionally, in some embodiments of the present application, the display device further comprises: a cover plate fixed to one side of the polarizer away from the display panel through an optical adhesive layer, wherein at least one of the optical adhesive layer or the functional layer is added with a light absorber to reduce the transmittance of the light of the predetermined wavelength.

Optionally, in some embodiments of the present application, a proportion of the light absorber added in the optical adhesive layer is less than or equal to a proportion of the light absorber added in the functional layer.

ADVANTAGE OF THE PRESENT INVENTION

Compared with conventional techniques, the polarizer in the present application has the light absorber added in the functional layer to reduce the transmittance of the light of the predetermined wavelength. Specifically, at least one of the first adhesive layer, the second adhesive layer, the protective layer, or the optical adhesive layer is added with the light absorber to reduce the transmittance of light with a wavelength of 200 nm to 480 nm, thus reducing the transmittance to be less than 15%. By using the polarizer in the display device, it can effectively solve the problem that a luminescent material in the display panel changes after being irradiated by the light of the predetermined wavelength, which results in a significant decrease in a color temperature of the display panel. The present application also improves viewing angles as well as relieves a color shift problem and dark-state light leakage, thereby improving display performance of the display panel.

BRIEF DESCRIPTION OF DRAWINGS

In order to more clearly illustrate the embodiments of the present application, figures which will be described in the embodiments are briefly introduced hereinafter. It is obvious that the drawings are merely for the purposes of illustrating some embodiments of the present application, and a person having ordinary skill in this field can obtain other figures according to these figures without inventive work.

Figure 1:
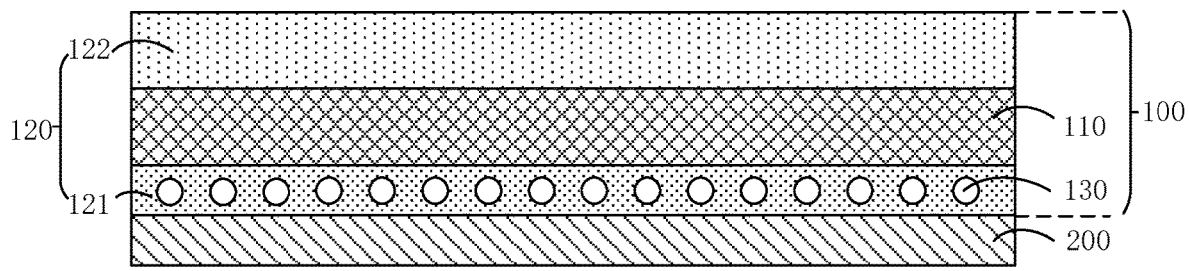
FIG. 1 is a schematic view illustrating a first structure of a display device according to one embodiment of the present application.

DESCRIPTION OF THE MAIN REFERENCE NUMERALS 10 display device; 1221 hardened layer
100 polarizer; 130 light absorber
110 polarizing layer; 140 compensation layer
120 functional layer; 150 release film layer
121 adhesive layer; 200 display panel
1211 first adhesive layer; 300 optical adhesive layer
1212 second adhesive layer; 400 cover plate
122 protective layer

DETAILED DESCRIPTION OF EMBODIMENTS

The technical solutions in embodiments of the present application are clearly and completely described below in conjunction with the accompanying drawings. Obviously, the described embodiments are only some of the embodiments of the present application, rather than all the embodiments. Based on the embodiments of the present application, all other embodiments obtained by those skilled in the art without creative work shall fall within the protection scope of the present application. In addition, it should be noted that the specific embodiments described herein are only used to illustrate and explain the present application, and are not used to limit the present application. In the present application, unless otherwise specified, directional terms such as "up", "down", "left", and "right" can refer to the directions in which a device is actually used or the directions of the device's working state, or the directional terms can refer to the directions in the drawings, or the direction terms can refer to two opposite directions; and "inner" and "outer" refer to directions with respect to outlines of the device.

Specifically, referring to FIG. 1, the present application provides a display device 10, comprising a display panel 200 and a polarizer 100. The polarizer 100 is fixed on one side of the display panel 200. The polarizer 100 comprises a polarizing layer 110 and at least one functional layer 120 stacked on the polarizing layer 110. A light absorber 130 is added to the functional layer 120 to reduce transmittance of light of a predetermined wavelength. The functional layer 120 comprises at least one adhesive layer 121 and at least one protective layer 122. The at least one adhesive layer 121 is disposed between the polarizer 100 and the display panel 200. The protective layer 122 is disposed on one side of the polarizer 100 away from the display panel 200. In the present application, the light absorber 130 is uniformly distributed in the functional layer 120, which can ensure that the polarizer 100 absorbs the light of the predetermined wavelength uniformly, and improves light transmission uniformity of the polarizer 100.

In the present application, one side of the adhesive layer 121 away from the polarizing layer 110 is used to bond the polarizer 100 to a bonding base. The bonding base can be any display panel or a display cover, etc., and the present embodiment is not limited in this regard. The polarizing layer 110 is a main part of the polarizer 100 that realizes a polarization function. A material of the polarizing layer 110 comprises polyvinyl alcohol (PVA). A thickness of the polarizing layer 110 ranges from 10 um to 30 um, and is, for example, 15 um, 20 um, 25 um, etc. Since the polarizing layer has low strength, brittle and fragile characteristics, and high hydrophilicity, the protective layer 122 is disposed on one side of the polarizing layer to support and protect the polarizing layer 110, and effectively prevents the polarizing layer 110 from shrinking, deforming, absorbing water, and fading under influence of an ambient environment. In the present embodiment, a surface of the protective layer 122 can also undergo anti-reflection treatment and anti-glare treatment to meet diversified requirements. Those skilled in the art can understand that at least one of the adhesive layer 121 or the protective layer 122 is added with the light absorber 130 to reduce the transmittance of the light of the predetermined wavelength. The present invention mainly absorbs the light of the predetermined wavelength through the light absorber 130, thereby reducing damage of the light of the predetermined wavelength to the polarizing layer 110 in the polarizer 100 and enhancing stability of the polarizing layer 110.

The predetermined wavelength in the present application ranges from 200 nm to 480 nm. Specifically, the light of the predetermined wavelength comprises: ultraviolet light with a wavelength range of 200 nm to 380 nm and visible light with a wavelength range of 380 nm and 480 nm. For example: the ultraviolet light with a wavelength of 340 nm, the visible light with a wavelength of 400 nm, the visible light with a wavelength of 420 nm, etc. The light absorber 130 reduces transmittance of the ultraviolet light with the wavelength range of 200 nm to 380 nm and transmittance of the visible light with the wavelength range of 380 nm to 480 nm by absorbing the ultraviolet light with the wavelength range of 200 nm to 380 nm and the visible light with the wavelength range of 380 nm to 480 nm, thus further improving an absorption resistance ability of the polarizer 100 against ultraviolet light. The light absorber 130 can make the polarizer 100 have transmittance of less than 15% for the light of the predetermined wavelength. That is to say, for the ultraviolet light with the wavelength range of 200 nm to 380 nm and the visible light with the wavelength range of 380 nm to 480 nm, the transmittance is less than 15%. Preferably, the transmittance of the polarizer 100 to the light of the predetermined wavelength is less than 12%. Those skilled in the art can understand that the specific range of the predetermined wavelength in the present embodiment and the range of the transmittance of the polarizer 100 to the light of the predetermined wavelength can also be used in any embodiment of the present application, and a detailed description is not repeated for brevity.

Figure 2:
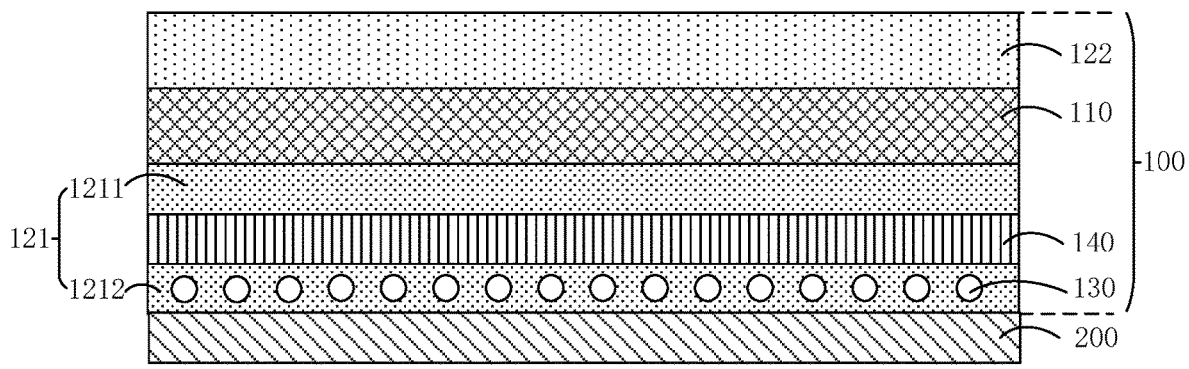
FIG. 2 is a schematic view illustrating a second structure of the display device according to one embodiment of the present application.

Referring to FIG. 2, in one embodiment of the present application, the functional layer 120 further comprises a compensation layer 140, the functional layer 120 comprises the two adhesive layers 121, and the two adhesive layers 121 are a first adhesive layer 1211 and a second adhesive layer 1212. The first adhesive layer 1211 is disposed on one side of the polarizing layer 110. The compensation layer 140 is disposed on one side of the first adhesive layer 1211 away from the polarizing layer 110. The second adhesive layer 1212 is arranged on one side of the compensation layer 140 away from the first adhesive layer 1211. The protective layer 122 is arranged on another side of the polarizing layer 110. At least one of the first adhesive layer 1211, the second adhesive layer 1212, or the protective layer 122 is added with the light absorber 130 to reduce the transmission of the light of the predetermined wavelength. One side of the second adhesive layer 1212 away from the compensation layer 140 is used to bond the polarizer 100 to a bonding base. The bonding base can be any display panel or a display cover, and the present embodiment is not limited in this regard. The compensation layer 140 is configured to provide polarization compensation, which compensates or corrects a phase difference at different viewing angles to a certain extent, thereby improving display image quality through the polarizer 100. The compensation layer 140 can also improve viewing angles as well as relieves color shift and dark-state light leakage. Those skilled in the art can understand that a position of adding the light absorber 130 in the present embodiment is not limited by FIG. 2. The light absorber 130 can also be added in the first adhesive layer 1211 and the protective layer 122. Preferably, the compensation layer 140 is also integrated with a polarizing brightness enhancement film, which can effectively improve the transmittance of the polarizer 100 to the light of wavelengths other than the predetermined wavelength.

Figure 3:
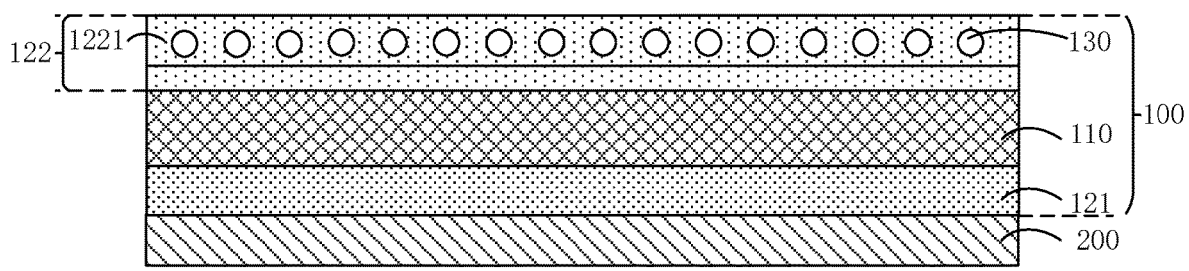
FIG. 3 is a schematic view illustrating a third structure of the display device according to one embodiment of the present application.

Referring to FIG. 3, the protective layer 122 in the present application comprises a hardened layer 1221. The hardened layer 1221 is disposed on one side of the protective layer 122 away from the polarizing layer 110. It should be noted that the hardened layer 1221 is part of the protective layer 122. That is to say, the hardened layer 1221 is disposed inside the protective layer 122 and is arranged away from the polarizing layer 110. Preferably, when the light absorber 130 is added in the protective layer 122, the light absorber 130 is added in the hardened layer 1221. The hardened layer 1221 can be disposed in the protective layer 122 in the foregoing embodiments. Specifically, the protective layer 122 can be disposed or can be not disposed with the hardened layer 1221, and the present application is not limited in this regard. Those skilled in the art can understand that the position of adding the light absorber 130 is not limited by FIG. 3. The hardened layer 1221 can be disposed in the protective layer 122 of the polarizer 100 in any embodiment of the present application, and a configuration is not limited to a structure of the polarizer 100 shown in FIG. 3. The hardened layer 1221 can enhance hardness, abrasion resistance, and erosion resistance of the polarizer 100. The hardness of the polarizer 100 provided with the hardened layer 1221 can reach 3H or higher.

Figure 4:
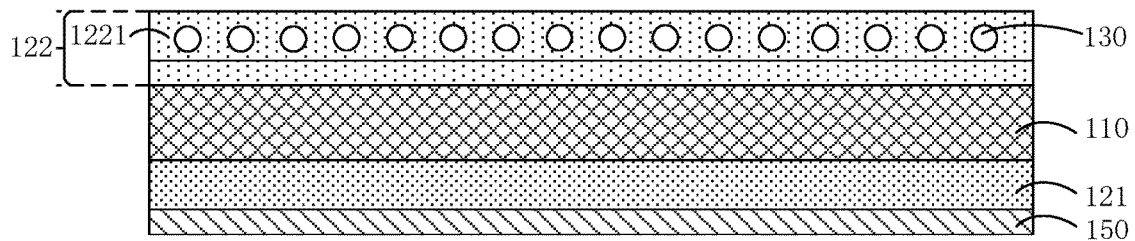
FIG. 4 is a schematic structural view of a polarizer according to one embodiment of the present application.

Referring to FIG. 4, the polarizer 100 further comprises a release film layer 150, and the release film layer 150 is disposed on one side of the adhesive layer 121 away from the polarizing layer 110. Specifically, the release film layer 150 is disposed on one side of the first adhesive layer 1211 or the second adhesive layer 1212 away from the polarizing layer 110, and a configuration is not limited to FIG. 4. Similarly, the release film layer 150 can be disposed in the polarizer 100 according to any embodiment of the present application, and a configuration is not limited to a structure of the polarizer 100 in FIG. 4. The release film layer 150 protects the polarizer 100 and is configured to protect the adhesive layer 121 and prevent the adhesive layer 121 from being exposed to a natural environment and losing its viscosity. A material of the release film layer 150 comprises polyethylene terephthalate (PET). It should be noted that when the polarizer 100 is attached to the display panel 200, the release film layer 150 is peeled off. At this time, the polarizer 100 after the release film layer 150 is peeled off has the same structure as a structure shown in FIG. 1.

Figure 5:
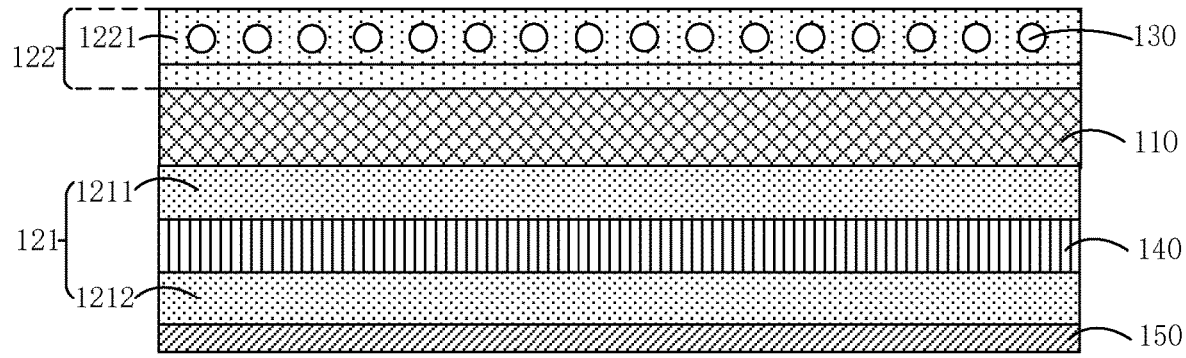
FIG. 5 is another schematic structural view of the polarizer according to one embodiment of the present application.

Referring to FIG. 5, in one embodiment of the present application, the functional layer 120 further comprises a compensation layer 140 and a release film layer 150. The functional layer 120 comprises the two adhesive layers 121 and the protective layer 122. The two adhesive layers 121 are the first adhesive layer 1211 and the second adhesive layer 1212. The protective layer 122 is disposed on one side of the polarizing layer 110. The protective layer 122 comprises a hardened layer 1221, and the hardened layer 1221 is disposed on one side of the protective layer 122 away from the polarizing layer 110. The first adhesive layer 1211 is disposed on one side of the polarizing layer 110 away from the protective layer 122. The compensation layer 140 is disposed on one side of the first adhesive layer 1211 away from the polarizing layer 110. The second adhesive layer 1212 is disposed on one side of the compensation layer 140 away from the first adhesive layer 1211. The release film layer 150 is disposed on one side of the second adhesive layer 1212 away from the compensation layer 140. The light absorber 130 is added in at least one of the first adhesive layer 1211, the second adhesive layer 1212, or the protective layer 122 to reduce the transmittance of the light of the predetermined wavelength. Those skilled in the art can understand that the position of adding the light absorber 130 in the present embodiment is not limited by FIG. 5. The light absorber 130 can also be added in the first adhesive layer 1211 and the protective layer 122. As shown in FIG. 5, when the polarizer 100 is attached to the display panel 200, the release film layer 150 is peeled off. After the release film layer 150 is peeled off, the polarizer 100 has the same structure as a structure shown in FIG. 2.

Figure 6:
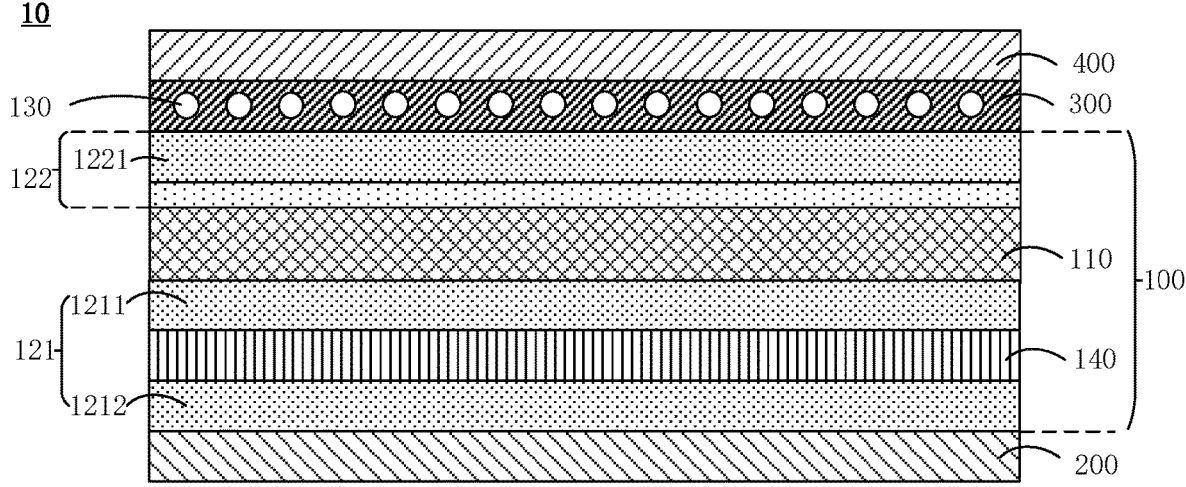
FIG. 6 is a schematic view illustrating a fourth structure of the display device according to one embodiment of the present application.

Please refer to FIG. 6. In some embodiments of the present application, the display device 10 further comprises a cover plate 400. The cover plate 400 is fixed to one side of the polarizer 100 away from the display panel 200 by means of an optical adhesive layer 300. The light absorber 130 is added in at least one of the optical adhesive layer 300 or the functional layer 120 to reduce the transmittance of the light of the predetermined wavelength. It should be noted that the cover plate 400 and the optical adhesive layer 300 can be disposed in the display device 10 described in any of the above embodiments, and a configuration is not limited to FIG. 6. As shown in FIG. 6, the light absorber 130 is added in the optical adhesive layer 300. Those skilled in the art can understand that the position of adding the light absorber 130 in the present embodiment is not limited by FIGS. 1 to 6. The light absorber 130 can also be added in the protective layer 122 and the adhesive layer 121. At least one of the adhesive layer 121, the protective layer 122, or the optical adhesive layer 300 is added with the light absorber 130. Specifically, this relates to the following seven scenarios: the adhesive layer 121 is added with the light absorber 130; the protective layer 122 is added with the light absorber 130; the optical adhesive layer 300 is added with the light absorber 130; the adhesive layer 121 and the protective layer 122 are both added with the light absorber 130; the adhesive layer 121 and the optical adhesive layer 300 are both added with the light absorber 130; the protective layer 122 and the optical adhesive layer 300 are both added with the light absorber 130; and the adhesive layer 121, the protective layer 122, and the optical adhesive layer 300 are added with the light absorber 130 at the same time. For details about adding the light absorber 130 to at least one layer in other embodiments of the present application, please refer to the present embodiment, and a detailed description is omitted for brevity.

In one embodiment of the present application, the display panel 200 and the cover plate 400 can interchange their positions relative to the polarizer 100. That is to say, the polarizer 100 is fixed to the cover plate 400 by means of the second adhesive layer 1212, and the polarizer 100 is fixed to the display panel 200 by means of the optical adhesive layer 300. In other words, the polarizer 100 only needs to be disposed between the display panel 200 and the cover plate 400.

In one embodiment of the present application, adding the light absorber 130 in the optical adhesive layer 300 only needs to meet photocuring requirements of the optical adhesive layer 300. Preferably, a proportion of the light absorber 130 added in the optical adhesive layer 300 is less than or equal to a proportion of the light absorber 130 added in the functional layer 120. The display panel 200 is a conventional display panel in the art, and is preferably an OLED display panel. The optical adhesive layer 300 is a transparent material. The display device 10 is provided with the polarizer 100, which can effectively solve a problem that a luminescent material in the display panel 200 changes after being irradiated by the light of the predetermined wavelength, resulting in a significant decrease in the color temperature of the display panel 200. The present application also improves viewing angles as well as relieves color shift and dark-state light leakage, thereby improving display performance of the display panel.

In the present application, a material of the protective layer 122 comprises at least one of triacetyl cellulose (TAC), polymethyl methacrylate (PMMA, also known as acrylic), polyethylene terephthalate (PET), or cyclic olefin polymer (COP). The material of the protective layer 122 can also be no retardation TAC (NTR), which is more advantageous for alleviating the problem of dark-state light leakage. The above-mentioned materials all have high strength, heat sensitivity, and high permeability, which improves overall performance of the polarizer 100. The material of the adhesive layer 121 comprises a pressure-sensitive adhesive, and those skilled in the art can understand that the adhesive layer 121 is a transparent material.

Further, the display device 10 can be any product or a device with a display function, such as a liquid crystal panel, a mobile phone, a tablet computer, a television, a monitor, a laptop, a digital photo frame, a navigator, and the like. Other indispensable components of the display device 10 are understood by those of ordinary skill in the art, so a detailed description thereof is omitted here and should not be used as a limitation to the present application.

In summary, compared with conventional techniques, the polarizer 100 in the present application has the light absorber 130 added in the functional layer 120 to reduce the transmittance of the light of the predetermined wavelength. Specifically, at least one of the first adhesive layer 1211, the second adhesive layer 1212, the protective layer 122, or the optical adhesive layer 300 is added with the light absorber 130 to reduce the transmittance of the light with the wavelength of 200 nm to 480 nm, thus reducing the transmittance to be less than 15%. By using the polarizer 100 in the display device 10, it can effectively solve the problem that the luminescent material in the display panel 200 changes after being irradiated by the light of the predetermined wavelength, which results in the significant decrease in the color temperature of the display panel 200. Accordingly, the present application also improves the viewing angles as well as relieves the color shift and the dark-state light leakage, thereby improving the display performance of the display panel.

In the above-mentioned embodiments, the description of each embodiment has its own emphasis. For those that are not described in detail in one embodiment, reference may be made to related descriptions of other embodiments.

The above describes in detail the display device 10 of the present application. Specific examples are used in the present disclosure to describe the principles and the embodiments of the present application. The description of the above embodiments is only for ease of understanding the approach of the present application and its main ideas. According to the ideas of the present application, those skilled in the art can change the embodiments and their applications. In summary, the content of this specification should not be construed as a limitation to the present application.

What is claimed is:

1. A polarizer, comprising:
a polarizing layer and at least one functional layer stacked on the polarizing layer, wherein a light absorber is added in the at least one functional layer to reduce transmittance of light of a predetermined wavelength, wherein a transmittance of the polarizer to the light of the predetermined wavelength is less than 15%, and the predetermined wavelength ranges from 200 nm to 480 nm,
wherein the at least one functional layer comprises two adhesive layers, a compensation layer and at least one protective layer, wherein the two adhesive layers are a first adhesive layer and a second adhesive layer, and the first adhesive layer and the second adhesive layer are disposed between the polarizer and a display panel; the compensation layer is disposed on one side of the first adhesive layer away from the polarizing layer and is disposed between the first adhesive layer and the second adhesive layer; the at least one protective layer is disposed on another side of the polarizer; the second adhesive layer is disposed on one side of the compensation layer away from the first adhesive layer, and the polarizer is fixed to the display panel through the second adhesive layer; and further comprising: an optical adhesive layer disposed on one side of a hardened layer away from the protective layer, and a cover plate disposed on a side of the optical adhesive layer away from the hardened layer, wherein a stacking sequence in the polarizer from bottom to top is the display panel, the second adhesive layer, the compensation layer, the first adhesive layer, the polarizing layer, the protective layer, the hardened layer, and the optical adhesive layer.

2. The polarizer according to claim 1, wherein the protective layer comprises a hardened layer, and the hardened layer is arranged on one side of the protective layer away from the polarizing layer.

3. A display device comprising a display panel and a polarizer, wherein the polarizer is fixed on one side of the display panel, the polarizer comprises a polarizing layer and at least one functional layer stacked on the polarizing layer, and a light absorber is added in the at least one functional layer to reduce transmittance of light of a predetermined wavelengths wherein a transmittance of the polarizer to the light of the predetermined wavelength$_x$ is less than 15%, and the predetermined wavelength ranges from 200 nm to 480 nm, wherein the at least one functional layer comprises two adhesive layers, a compensation layer and at least one protective layer, wherein the two adhesive layers are a first adhesive layer and a second adhesive layer, and the first adhesive layer and the second adhesive layer are disposed between the polarizer and the display panel; the compensation layer is disposed on one side of the first adhesive layer away from the polarizing layer and is disposed between the first adhesive layer and the second adhesive layer; the at least one protective layer is disposed on one side of the polarizer away from the display panel; the second adhesive layer is disposed on one side of the compensation layer away from the first adhesive layer, and the polarizer is fixed to the display panel through the second adhesive layer; and further comprising: an optical adhesive layer disposed on one side of a hardened layer away from the protective layer, and a cover plate disposed on a side of the optical adhesive layer away from the hardened layer, wherein a stacking sequence in the display device from bottom to top is the display panel, the second adhesive layer the compensation layer, the first adhesive layer, the polarizing layer, the protective layer, the hardened layer, and the optical adhesive layer.

4. The display device according to claim 3, wherein the protective layer comprises a hardened layer, and the hardened layer is arranged on one side of the protective layer away from the polarizing layer.

5. The display device according to claim 3, wherein a material of the polarizing layer comprises polyvinyl alcohol.

6. The display device according to claim 3, wherein a material of the protective layer comprises at least one of triacetyl cellulose, polymethyl methacrylate, polyethylene terephthalate, or cyclic olefin polymer.

7. The display device according to claim 3, wherein a material of the at least one adhesive layer comprises a pressure sensitive adhesive.

8. The display device according to claim 3, further comprising: a cover plate fixed to one side of the polarizer away from the display panel through an optical adhesive layer, wherein the light absorber is added to the optical adhesive layer, and the optical adhesive layer is disposed between the cover and the polarizer.

9. The display device according to claim 8, wherein a proportion of the light absorber added in the optical adhesive layer is less than or equal to a proportion of the light absorber added in any of the at least one functional layer added with the light absorber.

* * * * *